United States Patent
Balajadia

[19]

[11] Patent Number: 6,007,084

[45] Date of Patent: Dec. 28, 1999

[54] FRONT DRIVE TRAIN BICYCLE

[76] Inventor: Jose P. Balajadia, 61-15 98 St., Apt. 3J, Rego Park, N.Y. 11374

[21] Appl. No.: 08/951,777

[22] Filed: Oct. 16, 1997

[51] Int. Cl.$^6$ .................................................. B62M 1/02
[52] U.S. Cl. ................................. 280/261; 280/281.1
[58] Field of Search ................................. 280/259, 260, 280/261, 281.1, 279, 288.4

[56] References Cited

U.S. PATENT DOCUMENTS

| | | | |
|---|---|---|---|
| 356,095 | 1/1887 | Bouck | 280/261 |
| 434,605 | 8/1890 | Molin | 280/260 |
| 1,846,224 | 2/1932 | Roberds | 280/261 |
| 4,618,160 | 10/1986 | McElfresh | 280/261 |
| 4,773,662 | 9/1988 | Phillips | 280/261 |
| 5,501,478 | 3/1996 | Doan | 280/282 |
| 5,568,935 | 10/1996 | Mason | 280/282 |

FOREIGN PATENT DOCUMENTS 8869 of 1885 United Kingdom .................. 280/261

OTHER PUBLICATIONS

Bicycle Maintenance and Repair, —1986 Rodale Press, Inc. p. 14.
The Bicycle Repair Book—1985. Rob Van Der Plas p. 41.

*Primary Examiner*—Lanna Mai
*Assistant Examiner*—Avraham H. Lerner

[57] ABSTRACT

A front drive train bicycle has practically the parts of a simple bicycle. The major difference is in the location of the drive train. The front drive train bicycle has a steerer tube extension (38) where the bottom bracket shell. (22) is attached. A crankset consisting of a bottom bracket (21), a chainwheel (24), crank arm (52), and pedals (54) is attached to the bottom bracket shell (22). A rear wheel (32) with its gear or freewheel (28) is attached to the fork tips (42). A chain (26) connects the chainwheel (24) to the rear wheel gear or freewheel (28). A front wheel (34) is attached to the rear dropouts (44). A down tube stay (30) is used instead of a chainstay (20). The front drive train bicycle has a shorter overall length because there is no bottom bracket between the two wheels and also because it uses relatively smaller wheels. It is also lighter in weight because of these. It requires less space for parking and storing away. It is easy to lift and carry around.

1 Claim, 5 Drawing Sheets

PRIOR ART-BICYCLE FRAME

FIG. 4 PRIOR ART - BICYCLE

FRONT DRIVE TRAIN BICYCLE

BACKGROUND:

1. Field of Invention

This invention relates to bicycles specifically to one with a front drive train.

2. Discussion of Prior Art

Originally and up to today, bicycles are made with rear drive train. This setup requires too much space increasing the overall length of the bicycle. A longer bicycle requires much space in parking and in storing it at home. A shorter overall length is clearly desirable.

However, the simple bicycle is relevant to my invention.

The simple bicycle as a prior art is the basis of my invention. I need not elaborate in describing it since we are all familiar with it.

Objects and Advantages

Accordingly, several objects and advantages of my invention are: 1. shorter overall length which makes it easier to park and store away and 2. lighter in overall weight due to savings in the amount of material used in the frame not to mention the relativly small wheels used in it.

Objects and advantages of my invention are: less effort to push the pedals and 2. less effort needed to lift and carry.

Further objects and advantages of my invention will become apparent from a consideration of the drawings and ensuing description.

LIST OF REFERENCE NUMERALS

Figure 1:
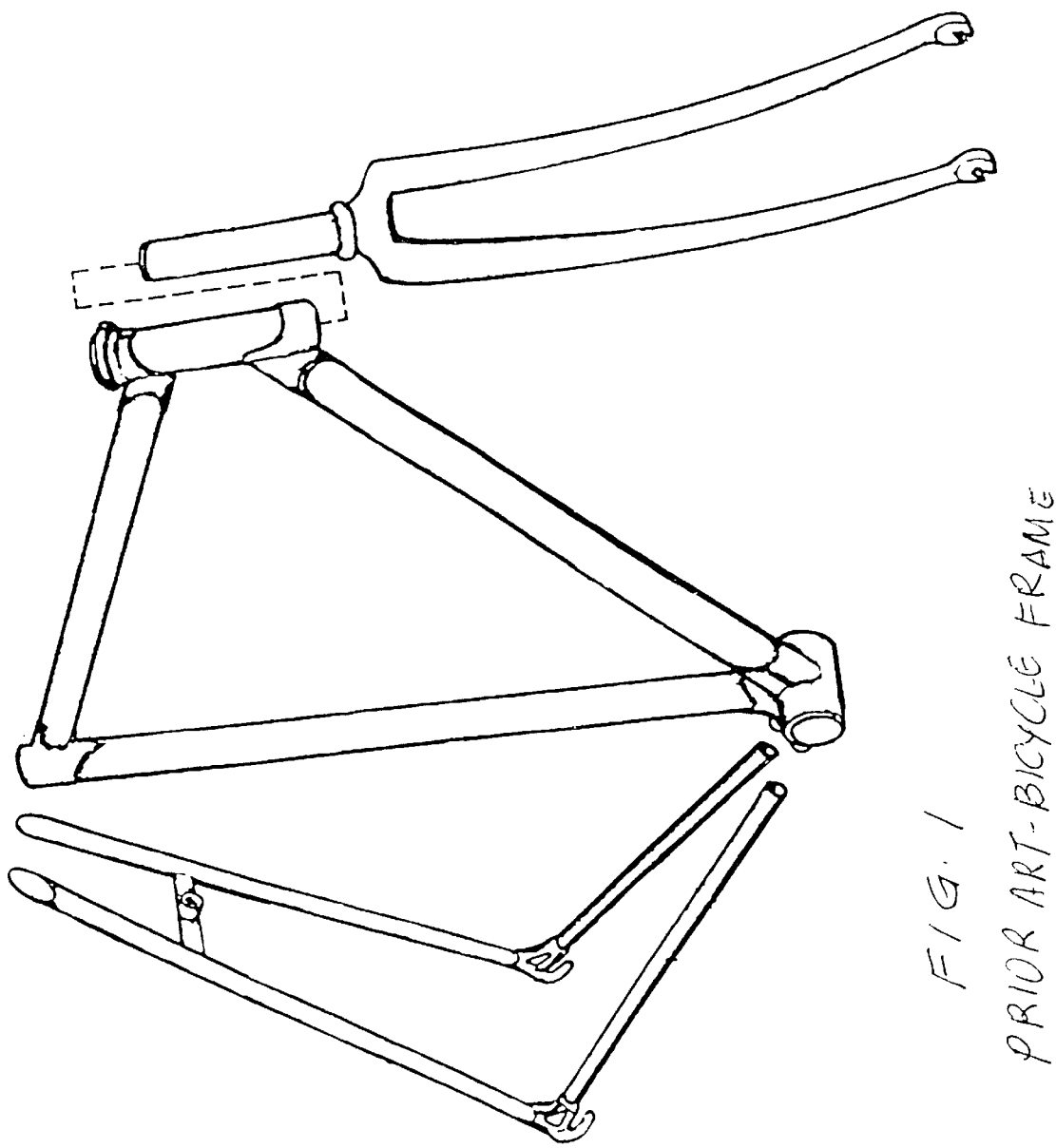
FIG. 1 is a perspective of a simple bicycle frame.
Figure 2:
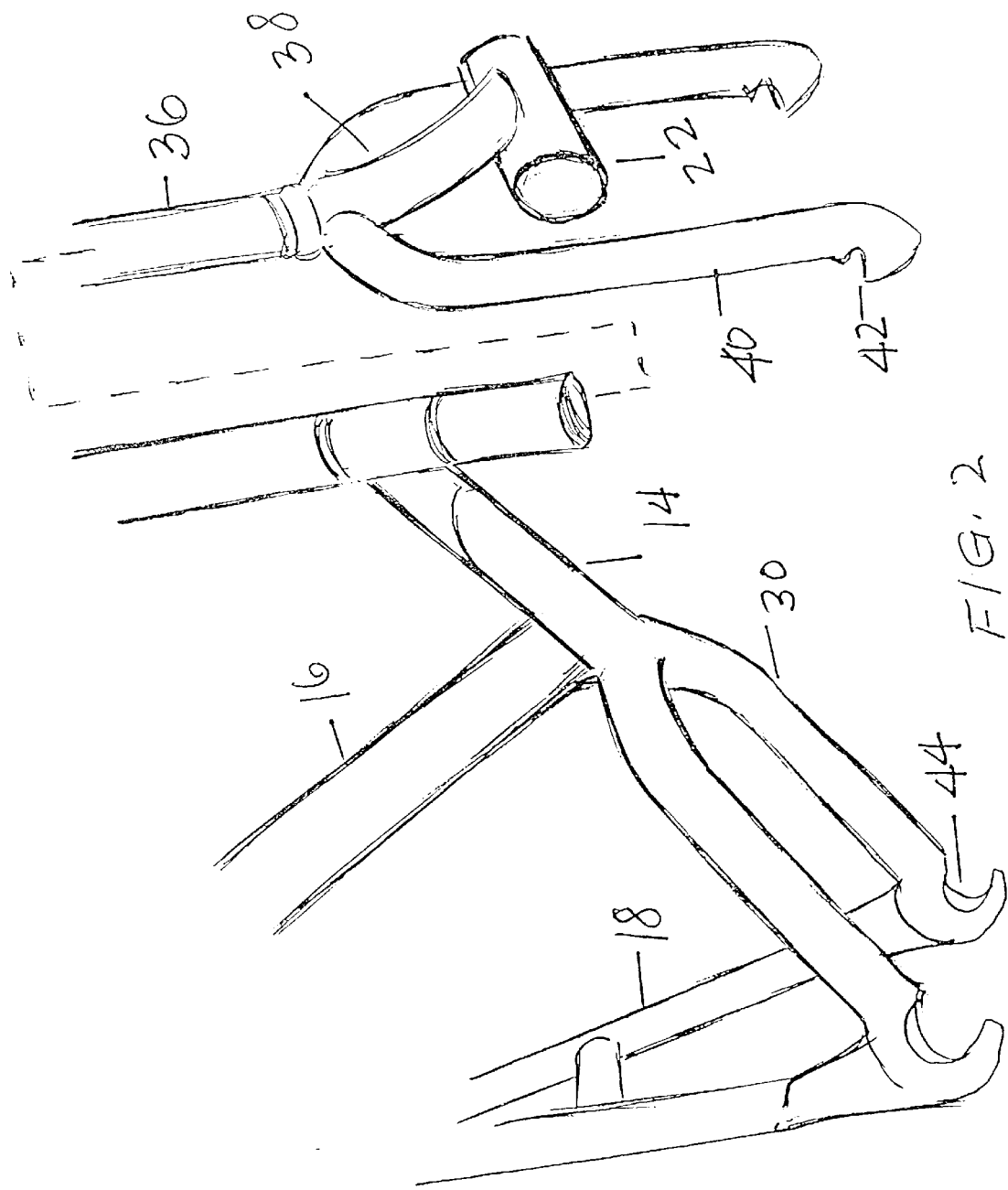
FIG. 2 is a perspective of a front drive train bicycle frame.
Figure 3:
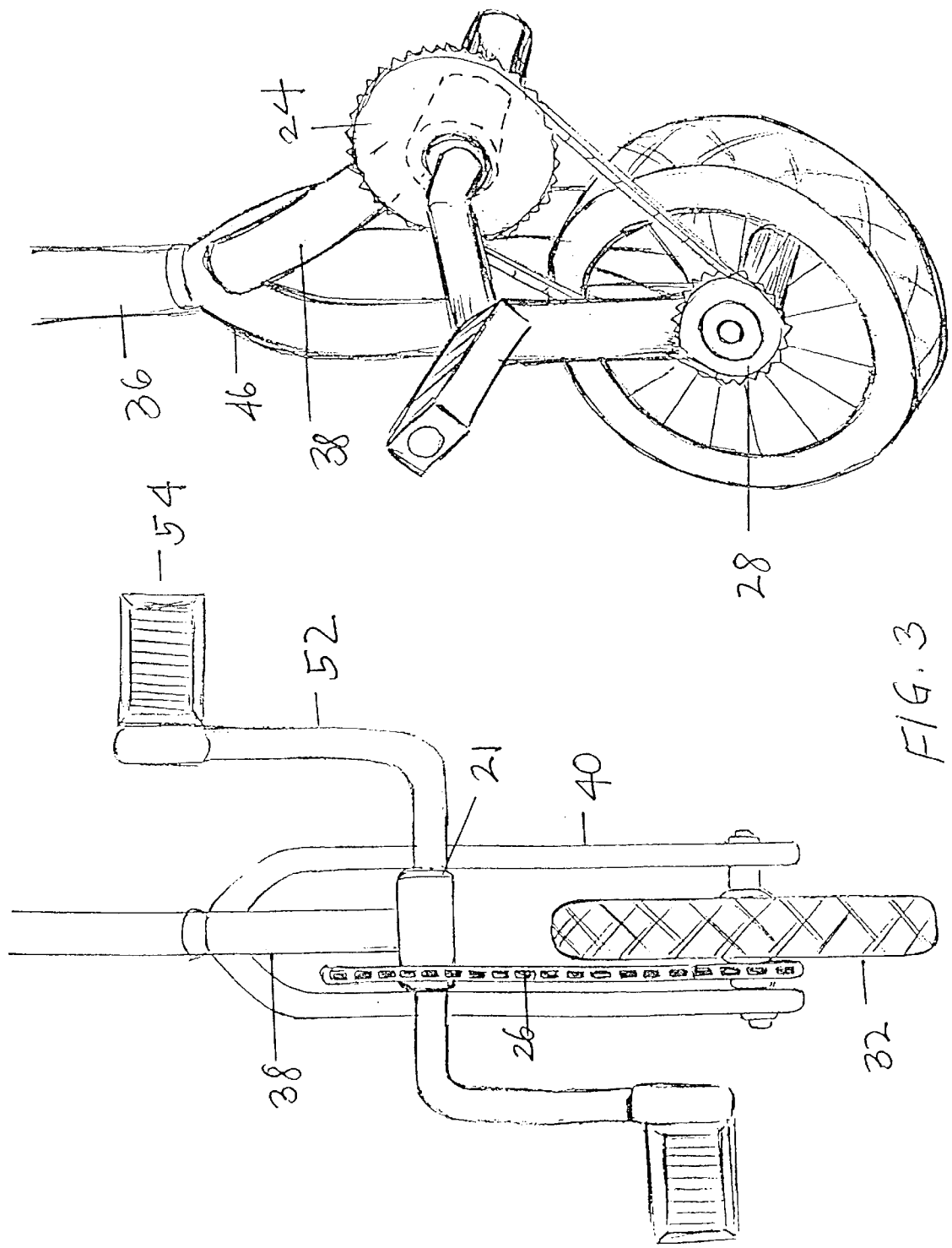
FIG. 3 is a perspective detail of a front drive train.
Figure 4:
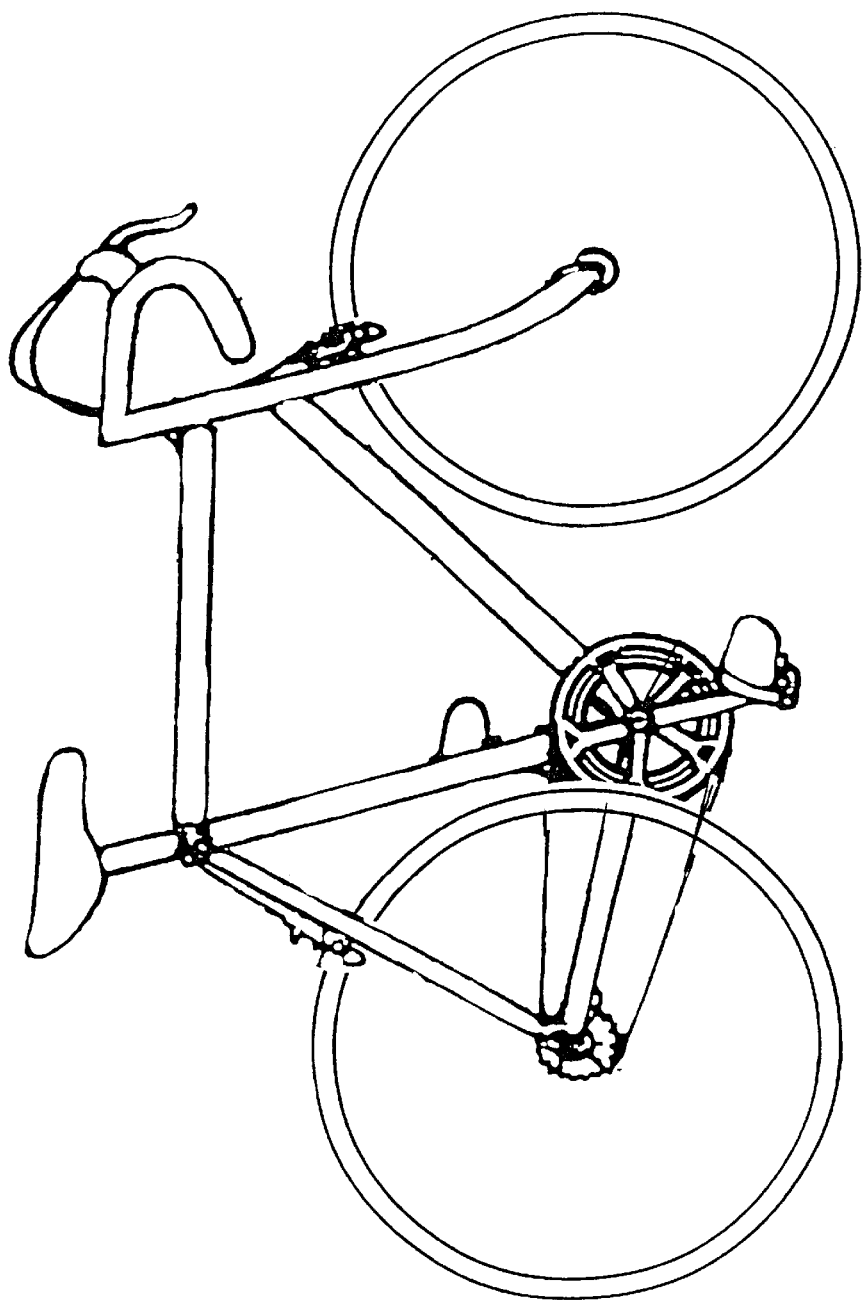
FIG. 4 is an elevation of a simple bicycle.
Figure 5:
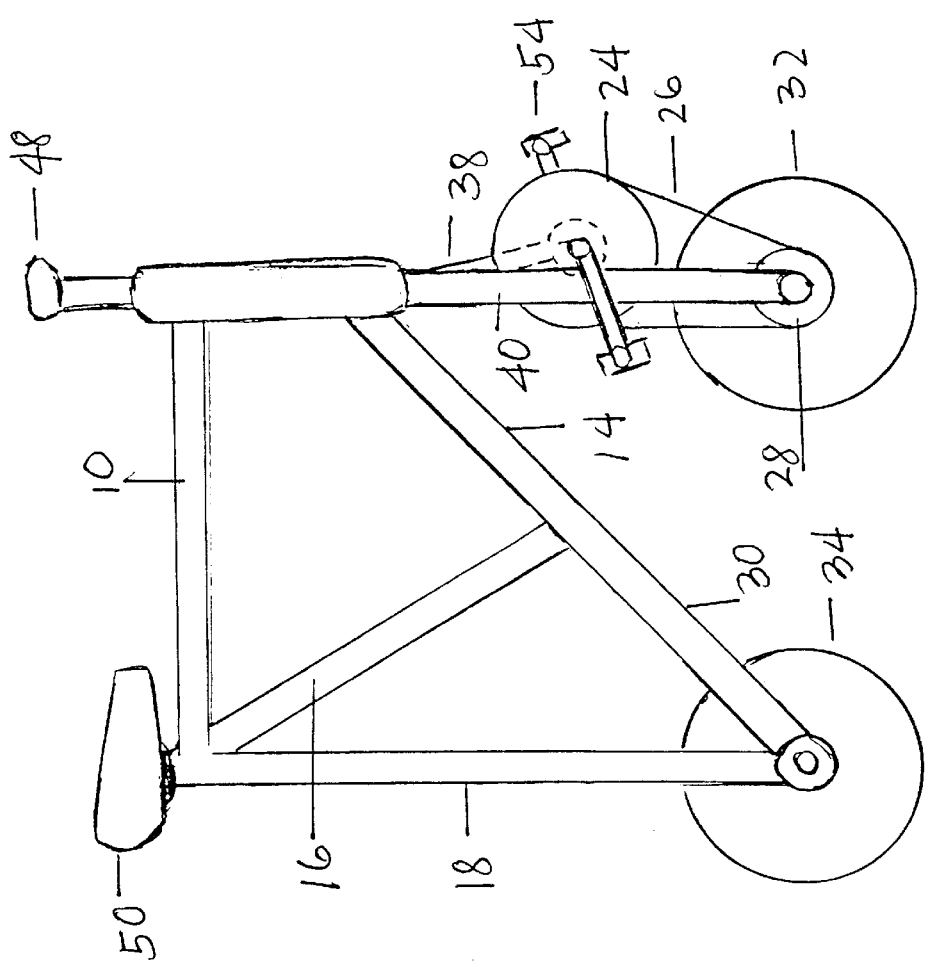
FIG. 5 is an elevation of a front drive train bicycle.

10—top tube
12—head tube
14—down tube
16—seat tube
18—seatstay
20—chainstay
21—bottom bracket
22—bottom bracket shell
24—chainwheel
26—chain
28—rear wheel gear or freewheel
30—down tube stay
32—front wheel
34—rear wheel
36—steerer tube
38—steerer tube extension
40—fork blade
42 fork tip
44—rear dropout
46—fork crown
48—handlebar
50—saddle
52—crankarm
54—pedal

SUMMARY

A front drive train bicycle has practically the parts of a simple bicycle. Its bottom bracket and rear wheel are at the front in contrast with a simple bicycle which has its bottom bracket and rear wheel at the rear.

DESCRIPTION OF INVENTION

The front drive train bicycle has practically the parts of a simple bicycle. Therefore, it would be easier to describe it by simply citing their differences.

The front drive train bicycle has a steerer tube extension (38) which extends beyond the fork crown (46) and ends at a distance above the front wheel (32). The bottom bracket shell (22) is attached to it. A crankset consisting of a bottom bracket (21), a chainwheel (24), a crankarm (52), and pedals (54) is attached to the bottom bracket shell (22). The front wheel (32) with its gear or freewheel (28) is attached to the fork tips (42). A chain (26) connects the chainwheel (24) to the front wheel gear or freewheel (28). A rear wheel (34) is attached to the rear dropouts (44). A down tube stay (30) is used instead of a chainstay (20).

The front drive train bicycle is shorter in overall length because of the absence of a drive train between the two wheels.

The front drive train bicycle uses relatively smaller wheels. It is compact and light in overall weight in general. It requires less space to park and store away.

OPERATION OF INVENTION

The operation of the front drive train bicycle is similar to that of any bicycle.

CONCLUSIONS, RAMIFICATIONS, AND SCOPE OF INVENTION

Thus the reader will see that the front drive train bicycle compact and lightweight. It requires less space to park and store away. It is easy to lift and carry.

While my above description contains many specificities, these should not be construed as limitations on the scope of the invention, but rather as an exemplification of one preferred embodiment thereof. Many other variations are possible. For example:

1. by modifying the frame to suit the arrangement of additional wheels at the rear, a plurality of wheels may have a line formation, an across formation, a rectangular formation,a square formation, etc,
2. by modifying the frame and with a plurality of wheels, the front drive train may be pulling a board, platform, or any other means of carrying passengers or goods,
3. the front drive train may be attached to a soap box car, a wheelchair,
4. the front drive train by itself alone may be made into a unicycle,
5. the front drive train by itself may be attached to a carriage, board on wheels, paltform on wheels, and any other means to carry passengers or goods to be pushed forward.

Accordingly, the scope of the invention should be determined not by the embodiments illustrated, but by the appended claims and their legal equivalents.

I claim:

1. A front drive train vehicle comprising:

a frame including a head tube rotatably attached to a steerer tube, the steerer tube being connected to and extending upwardly from a fork crown and a pair of fork blades which rotatably support a geared front wheel;

the frame further including a seat stay supporting at least one gearless rear wheel, and a down tube connecting the head tube and the seat stay;

a steerer tube extension attached to the fork crown and extending downwardly and forwardly, the steerer tube extension terminating with a bottom bracket shell positioned above and in front of the front wheel; and a crankset attached to the bottom bracket shell, the crankset including a bottom bracket, a crankarm having two pedals, a chainwheel, and means for connecting the chainwheel to the front wheel gear such that pushing the pedals and thereby rotating the crankarm drives the front wheel.

\* \* \* \* \*